No. 780,363. PATENTED JAN. 17, 1905.
R. L. MASSEY.
CABOOSE LIGHT.
APPLICATION FILED MAY 4, 1904.
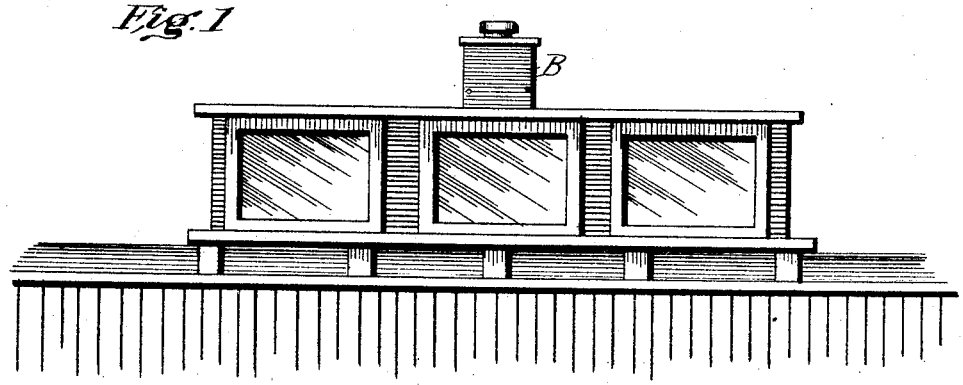
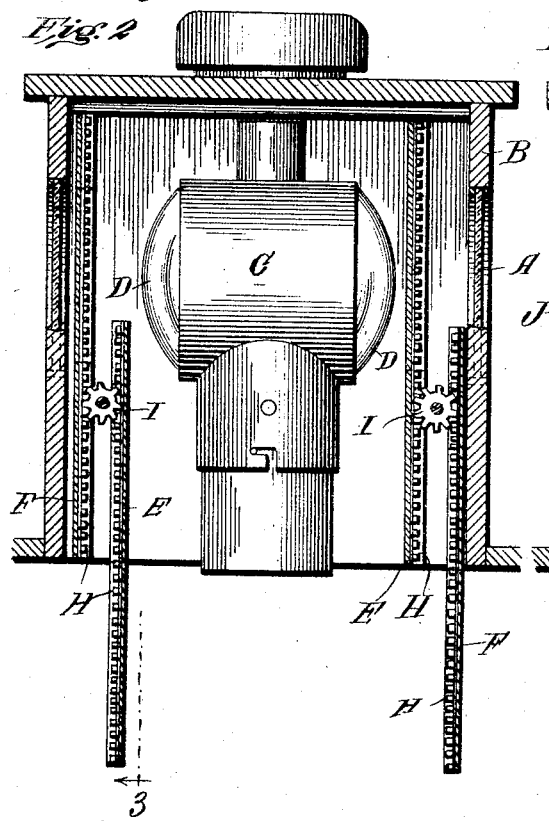
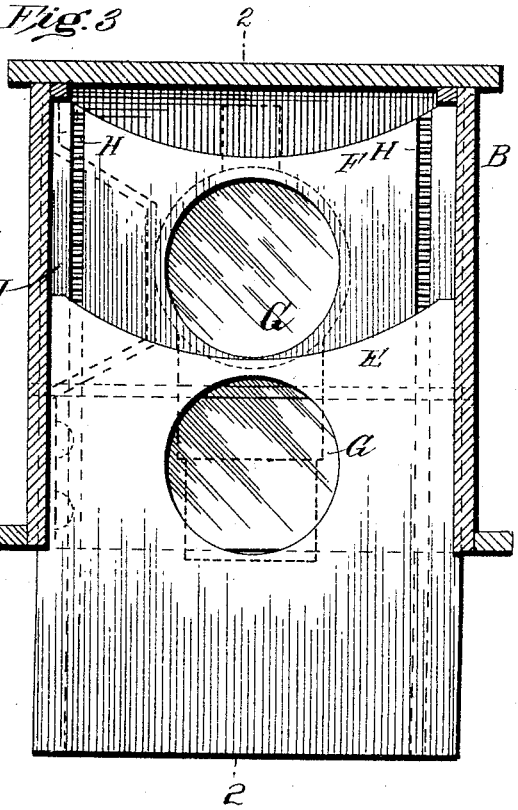
WITNESSES:
C. Edward Duffey
Harrison B Brown
INVENTOR
Robert L. Massey
BY Munn & Co.
ATTORNEYS No. 780,363. Patented January 17, 1905.

UNITED STATES PATENT OFFICE.

ROBERT LEE MASSEY, OF GRAND ISLAND, NEBRASKA.

CABOOSE-LIGHT.

SPECIFICATION forming part of Letters Patent No. 780,363, dated January 17, 1905.

Application filed May 4, 1904. Serial No. 206,350.

*To all whom it may concern:*

Be it known that I, ROBERT LEE MASSEY, a citizen of the United States, and a resident of Grand Island, in the county of Hall and State of Nebraska, have invented a new and Improved Caboose-Light, of which the following is a specification.

My invention relates to lights of the above-stated character adapted for indicating "safety" or "danger," and has for its objects ready and simplified means adapting the light to be set from within the caboose and which means shall operate automatically, restoring the light from "safety" to "danger" upon withdrawing the safety-signal and vice versa when the danger-signal is withdrawn.

The invention consists of the special construction and arrangement of parts, which will hereinafter be fully described, shown in the accompanying drawings, and pointed out in the claim.

In the drawings, Figure 1 is a view showing the cupola of caboose-car and a broken-away portion of the caboose roof and side to which my invention is applied. Fig. 2 is a vertical sectional view taken on line 2 2 of Fig. 3, and Fig. 3 is a similar view taken on line 3 3 of Fig. 2.

In the practice of my invention I arrange plain glass window-lights A in the front and rear ends of a caboose-cupola B, as shown in Fig. 2.

C denotes an approved type of lantern supported within the cupola B, having front and rear lenses D.

Within the caboose I slidably arrange between the front and rear lenses D of the lantern two frames E F, one of which has a green lens and the other a red lens, as indicated at G. The adjacent sides of the frames E F are provided with rack-teeth H, meshing with a fixedly-located pinion I, as shown in Fig. 2.

It is apparent from the above description that should the frame E be pulled down, as may readily be done by a person within the caboose, through operation of the interengaging gear I the frame F will be moved upwardly in slideways J of approved construction. Further description of the sliding frames being deemed unnecessary, it appears sufficient to say that according to my invention the withdrawal action of the red or green signal through the means shown and described automatically operates to reset the other signal—that is to say, when the frame F is shoved upwardly, carrying its lens G to position between the plain glass lens A and the lantern-lens D, the frame E, with its lens G, will be lowered from shading of lantern-lens. The sliding frames, with their lenses, being in duplicate to the front and rear of the lantern, obviously with my invention the front and rear signals on the caboose-cupola may be quickly displayed and without liability of inadvertently showing the wrong signal.

The position of the frames E F may be readily seen from within the caboose, and thereby indicate what colored lens is shading the lantern-lens. Obviously the lower edges of the sliding frames E F may be provided with handles or other means facilitating operation thereof, and they may be painted or suitably marked, indicating the respective colored lens carried thereby.

Obviously my suitable catch or spring-latch may be arranged on the caboose adapted for holding the frames E F as adjusted.

Having thus described my invention, what I claim as new, and desire to secure by Letters Patent, is—

The combination with the cupola of a car, of a lantern-case mounted upon the cupola, a lamp within said case, four spaced vertically-guided signal-shades within the case, two of said shades being located at opposite sides of the lamp and adapted to be drawn down and exposed within the cupola, pinions on horizontal axes located between the adjacent signal-shades, and racks arranged on adjacent sides of the said shades and with their teeth in mesh with their respective pinions, substantially as described.

ROBERT LEE MASSEY.

Witnesses:
HENRY S. HOOVER,
HENRY E. CLIFFORD.